United States Patent [19]

Wright

[11] 4,278,749

[45] Jul. 14, 1981

[54] RECEIVING ELEMENTS CONTAINING GRAFT GELATIN POLYMERS AS DYE MORDANTS

[75] Inventor: Peter J. Wright, Ilford, England

[73] Assignee: Ciba-Geigy AG, Basel, Switzerland

[21] Appl. No.: 118,243

[22] Filed: Feb. 4, 1980

[30] Foreign Application Priority Data

Sep. 3, 1979 [GB] United Kingdom ............... 8311/79

[51] Int. Cl.$^3$ .................. G03C 1/40; G03C 7/00; B41N 5/00; B41N 3/00
[52] U.S. Cl. .................. 430/213; 101/464; 260/8; 260/112 R; 260/117; 260/121; 260/123; 428/478.4; 428/478.8; 430/199; 430/941
[58] Field of Search .............. 430/199, 2 B, 628, 941, 430/514; 101/464; 428/474, 500, 522, 477; 106/124, 125, 138, 149; 260/8, 874, 117, 121, 123; 8/467

[56] References Cited

U.S. PATENT DOCUMENTS

| | | | |
|---|---|---|---|
| 2,713,305 | 7/1955 | Yutzy et al. | 430/213 |
| 3,756,814 | 9/1973 | Bedell | 430/213 |

Primary Examiner—Richard L. Schilling
Attorney, Agent, or Firm—Sprung, Felfe, Horn, Lynch & Kramer

[57] ABSTRACT

A photographic material which comprises a receiving element for transferred dyes is provided. The receiving element comprises a support having coated thereon a mordant layer which is made from a graft polymer prepared from gelatin, a monomer which when homopolymerized yields a water insoluble polymer and a monomer containing a sulphonate group which when homopolymerized yields a water soluble polymer.

These receiving elements can be used for mordanting cationic dyes in photographic dye transfer processes.

13 Claims, No Drawings

RECEIVING ELEMENTS CONTAINING GRAFT GELATIN POLYMERS AS DYE MORDANTS

This invention relates to receiving elements for transferred dyes and in particular cationic dyes.

Receiving elements for transferred dyes are of use in dye diffusion transfer processes in photography where dyes are generated in one layer of the photographic assembly and diffuse to a layer of a dye receiving element where they are mordanted. In such a process the dye is generated in an imagewise manner in a layer of the photographic assembly and diffuses imagewise to the receiving element where it is mordanted to form a dye image. In such a process the receiving element may be attached initially to the remainder of the photographic assembly and may, or may not, be separable therefrom after the dye image has been formed therein. Alternatively, the receiving element is not integral with the remainder of the photographic assembly but is held in face-to-face relationship with it in use to enable the diffusing dye to diffuse from the photographic assembly to the receiving element which is then removed from contact with the photographic assembly.

Receiving elements are also of use for certain dye imbibition processes in which a dye is transferred to a receiving element in an imagewise manner, for example, via an image stencil or from a gelatin image matrix. Such imbibition processes may be used in the production of colour positive duplicate film prints.

Receiving elements for both diffusion transfer processes and imbibition processes usually comprise a base on which is coated a dye mordant in a binder. Most mordants which have been used are polymeric substances soluble in water or organic solvents and they are usually coated with the binder as a solution. Such polymers rely on electrostatic and hydrophobic bonding to form a stable dye/mordant complex and these are usually ionically charged polymers of complicated structure made as solution polymers. The polymer must be non-diffusing in the dye receiving layer of the receiving element and difficulties have been experienced in producing suitable solution polymers of sufficiently high molecular weight for all the polymeric material to be of sufficiently high molecular weight to be non-diffusing in the receiving layer. If the polymeric material is prepared under forcing conditions to obtain higher molecular weight material often the polymer cross-links and thus is incapable of producing a true solution suitable for coating on the base of the receiving element. Useful solution polymers for mordanting cationic dyes would be those having a sulphonate or sulphate group therein. However such solution polymers find use as viscosity increasing agents in coating compositions, e.g. sodium cellulose sulphate and the polymers as described in U.S. Pat. No. 3,022,172. Thus aqueous solutions of such solution polymers have such a high viscosity that they cannot be used to prepare mordant layers.

We have now discovered a receiving element for use in mordanting dyes transferred thereto which does not make use of solution polymers as the mordant.

Therefore according to the present invention there is provided a receiving element for transferred dyes which comprises a support having coated thereon a mordant layer which comprises a graft polymer which is prepared from at least three components:

(a) a water-soluble proteinacious polymer,
(b) a monomer which when homopolymerised yields a water-insoluble polymer, and
(c) a monomer which comprises a sulphonate group and which when homopolymerised yields a water-soluble polymer.

It is to be understood that other components may be present for example the monomers which when homopolymerised yield a water-soluble polymer but which do not comprise a sulphonate group. However, such components do not appear to be beneficial in the graft polymer. Further, two or more monomers may be used to make up component (b) or component (c). However preferably only one proteinacious polymer is used as component (a).

The preferred ratio in the graft polymer of component (a) compared with component (b) is from 1(a):0.5(b) to 1(a):1.5(b) by weight. The preferred ratio in the graft polymer of component (b) compared with component (c) is from 1(b):0.05(c) to 1(b):0.5(c) by weight.

The preferred water-soluble proteinacious polymer (a) is gelatin but other proteinacious polymers, for example casein, albumen and collagen may be used.

The preferred monomers (b) which when homopolymerised yield a water-insoluble monomer are acrylic and vinyl monomers.

Particularly suitable monomers are acrylic monomers of the general formula

and vinyl monomers of the general formula

where $R_1$ is hydrogen, halogen or methyl, $R_2$ is alkyl or aryl and $R_3$ is aryl, acyloxy, or cyano.

Particularly preferred are the monomers, where $R_2$ is alkyl with 1 to 5 carbon atoms or phenyl, $R_3$ is phenyl, acyloxy with 1 to 4 carbon atoms or cyano and $R_1$ has the meaning assigned to it above.

Examples of especially suitable monomers of formulae (1) and (2) are styrene, acrylonitrile, vinyl acetate, methyl, methacrylate and ethyl acrylate.

The preferred monomers (c) which comprise a sulphonate group are acrylic monomers because of the ease with which these monomers copolymerise.

Particularly suitable monomers are acrylates or methacrylates of the general formula:

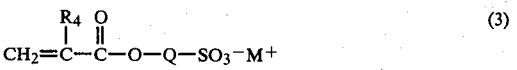

where $R_4$ is methyl or hydrogen, Q is a bivalent organic radical $M^+$ is an alkali metal or ammonium cation.

The bivalent organic radical Q is preferably an alkylene group with 2 to 6 carbon atoms optionally interrupted by further bivalent species as —O—, —S— or —NH—.

Other suitable monomers are acrylamides and methacrylamides of the general formula:

present invention include phenosafranine and other well known cationic dyes of the following formulae:

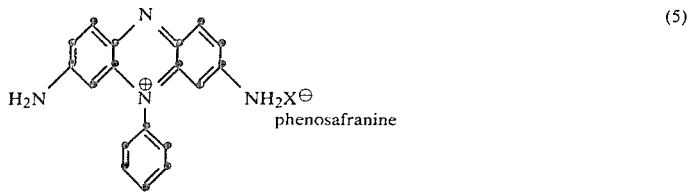

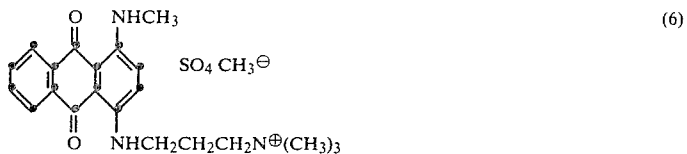

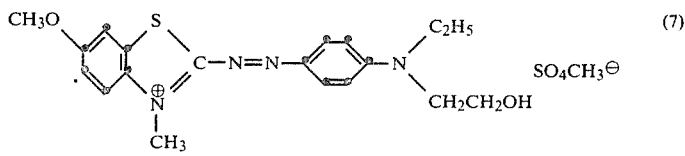

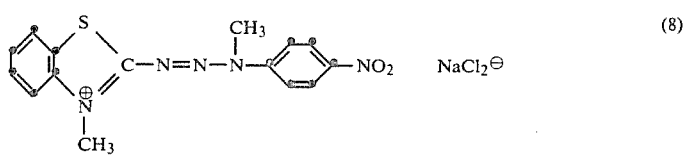

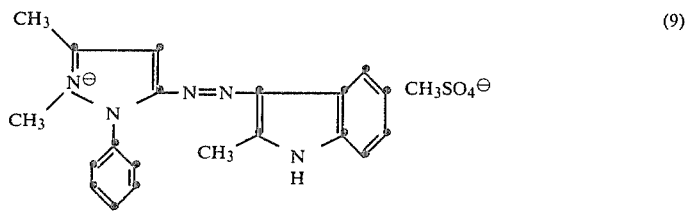

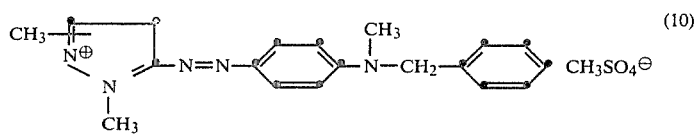

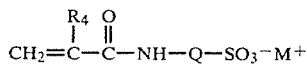

where $R_4$, Q and $M^+$ have the meanings assigned to them above.

Preferred bivalent organic radicals are alkylene groups and interrupted alkylene groups for example:

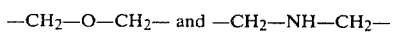

The graft polymer may be prepared using initiators normally used in the preparation of graft polymers. Such initiators include 2,2'-azobis-(2-methylpropionitrile), 4,4'-azobis-(4-cyanovaleric acid), potassium persulphate and ammonium persulphate.

Preferably the graft polymer is purified by ultrafiltration or dialysis to remove unreacted monomers.

The receiving elements of the present invention can be used in any cationic dye transfer process, even to colour overall the receiving layer.

Cationic dyes which may be used to demonstrate the mordanting capabilities of the receiving elements of the present invention include phenosafranine and other well known cationic dyes of the following formulae:

To prepare the receiving elements of the present invention using the grafts, the ultrafiltered solutions are diluted to give about a 3% by weight proteinacious polymer aqueous solution. Such solutions have a viscosity of less than about 20 centipoises and thus can easily be coated on a support. Preferably a non-ionic wetting agent is added to help in the coating and also a hardening agent for the proteinacious polymer. Suitable amounts of non-ionic wetting agent are 0.01 to 2% by weight of the graft terpolymer coating solution. Suitable amounts of hardening agent are 0.1 to 5% by weight of gelatin present.

Examples of suitable non-ionic wetting agents are saponin, polyethylene glycol, polyethylene glycol-polypropylene glycol condensate and polyalkylene glycol esters.

Examples of suitable proteinacious polymer hardening agents are formaldehyde, glutaraldehyde, glyoxal and derivatives of cyanuric chloride such as 2,4-dichloro-6-hydroxy triazine sodium salt.

The support for the receiving element may be a film base on which is coated the receiving layer containing the graft polymer or it may be a paper base on which is coated the receiving layer.

However, any other base as normally used as a photographic support may be used for example glass. If the receiving element is to be used in an imbibition process to achieve an artistic effect any type of rigid base may be used such as a metal plate or even wood. It is to be understood that there may be another layer or layers between the receiving layer and the base on which it is coated. Such layers may be for example subbing layers, neutralising layers or timing layers.

A suitable coating weight of graft polymer on the base to act as a mordanting layer is from 40 to 200 mg/dm$^2$. The graft polymer layer used as the mordant layer in the receiving element of the present invention is able to mordant cationic diffusible dyes substantively. The graft polymer is easy to coat and to dry down to form a smooth clean colourless layer.

The presence of component (b) helps to promote the good coating qualities of the polymer and also helps in some way not fully explainable to promote the uptake of the dye.

The receiving element of the present invention may be used in a photographic colour diffusion transfer process. In this case the receiving element may be an integral part of a photographic assembly which includes at least one light-sensitive layer. Usually the photographic assembly is light exposed, possibly through the base of the receiving element if this is transparent. Thereafter processing fluid is introduced into the assembly, this develops the photosensitive material and at the same time causes an imagewise transfer of at least one diffusible dye which is liberated in the assembly. The diffusible dye migrates to the receiving element where it is mordanted by the charged oligomer in the receiving layer. In some processes using such a photographic assembly the receiving layer remains integral with the remainder of the assembly but in other processes after the dye has been mordanted in the receiving layer, the receiving element is stripped away from the remainder of the photographic element. In yet other processes the receiving layer is not integral with the remainder of the photographic assembly although it may be attached thereto along one edge, for example. After imagewise exposure of the photographic assembly the receiving element is placed in face-to-face contact with the remainder of the assembly, processing fluid is placed therebetween and a transfer of at least one dye from the photosensitive part of the assembly to the receiving element takes place. When the transfer of a dye has been completed the receiving element can be removed from contact with the remainder of the photographic assembly.

Thus the invention includes light sensitive photographic assemblies which comprise a receiving element as hereinbefore defined.

The receiving element of the present invention is also of use in an imbibition transfer process for example the process wherein a relief gelatin image is formed on a matrix. This relief image is dyed with a cationic dye and the matrix is then pressed into contact with the receiving element so that the dye gelatin is in face-to-face contact with the receiving layer. Dye is then transferred to the receiving layer and is there mordanted.

Various other dye imbibition processes, in which the receiving element of the present invention can be used, are known, including a process in which the dye is transferred to the receiving layer through a stencil or imaged silk screen.

The following preparations will serve to illustrate the preparation of seven graft polymer of use in the receiving layer of the present invention.

PREPARATION 1

Graft polymer of gelatin, acrylonitrile and 2-acrylamido-2-methylpropane sulphonate (sodium salt).

500 ml of a 3% w/w aqueous gelatin solution were placed in a flask fitted with two dropping funnels, nitrogen inlet and outlet, reflux condenser and mechanical stirrer. N$_2$ was passed through the solution for 30 minutes as the temperature was raised to 80° C. 1.0 g of 4,4'-Azobis-(4-cyanovaleric acid) was added and then after two minutes 15 g of acrylonitrile, which was freed of inhibitor by distillation, and a solution of 9 g of 2-acrylamido-2-methylpropane sulphonic acid sodium salt in 15 ml of water were added to the solution over 15 minutes. Polymerisation was carried on for a further 90 minutes at 80° C. The solution was then filtered.

Determination of solids content showed that 81% of the acrylonitrile had been converted to polymer.

PREPARATION 2

Graft copolymer of gelatin, acrylonitrile and 2-acrylamido-2-methylpropane sulphonate (sodium salt).

A similar preparation was carried out to 1 above but 4.5 g of 2-acrylamido-2-methylpropane sulphonic acid sodium salt was added.

Determination of the solids content showed that 70% of the acrylonitrile had been converted to the graft polymer.

PREPARATION 3

Graft polymer of gelatin, styrene and 2-acrylamido-2-methylpropane sulphonate (sodium salt).

A similar preparation was carried out to 1 above but 15 g of styrene was used in place of the acrylonitrile and 2.25 g of the sodium salt of 2-acrylamido-2-methylpropane sulphonic acid.

Determination of the solids content showed that 92% of the styrene had been converted to the graft polymer.

PREPARATION 4

Graft polymer of gelatin, acrylonitrile and 2-acrylamido-2-methylpropane sulphonate (sodium salt).

500 ml of a 3% solution of gelatin in distilled water was placed in a flask fitted with a mechanical stirrer, thermometer, reflux condenser and a nitrogen inlet and outlet. The flask and its contents were heated to 40° C. under N$_2$ in a water bath. Acrylonitrile (15 g) and 2-acrylamido-2-methylpropane sulphonic acid (4.5 g) were then added and the pH of the mixture adjusted to 3.0 by addition of 10% aqueous sodium hydroxide solution. Nitrogen was then passed for 30 minutes. A redox catalyst consisting of 0.12 g sodium metabisulphite and 0.2 g potassium persulphate was then added, after 10 minutes the temperature had risen to 50° C. The polymerisation was continued for 2 hours at 40° C. 83% of the monomers had been converted to polymer.

PREPARATION 5

Graft polymer of casein, methyl methacrylate and 2-acrylamido-2-methylpropane sulphonic acid (sodium salt).

500 ml of a 3% solution of casein in distilled water was placed in a 1 liter flask fitted with stirrer, thermometer, reflux condenser and nitrogen inlet and outlet. The solution was heated to 80° C. in a water bath as nitrogen was passed through. 1 g of 4,4'-Azobis-(4-cyanovaleric acid) was added and then after 15 minutes methylmethacrylate (15 g) and the sodium salt of 2-acrylamido-2-methylpropane sulphonic acid (10.1 g) dissolved in 15 ml distilled water were added from separate dropping funnels over a 15 minute period. Polymerisation was continued for 2 hours at 80° C. under an atmosphere of nitrogen. Analysis showed that 97.4% of the monomers had been converted to polymeric form.

PREPARATION 6

Graft polymer of gelatin, methylmethacrylate and 2-acrylamido-2-methylpropane sulphonic acid (sodium salt).

Prepared in exactly the same manner as Preparation 5 except for the substitution of gelatin for the casein. Analysis showed that 85% of the starting monomers had been converted to polymeric form.

PREPARATION 7

Graft polymer of gelatin, styrene and sodium-4-acryloyloxybenzenesulphonate.

500 ml of a 3% solution of gelatin in distilled water was placed in a 1 liter flask fitted with stirrer, thermometer reflux condenser and nitrogen inlet and outlet. Nitrogen was passed through the solution for 30 minutes while the temperature was raised to 80° C., 1.4 g of 4,4'-azobis-(4-cyanovaleric) acid was then added. Styrene (15 g) and sodium-4-acryloyloxybenzenesulphonate (5.7 g) dissolved in 20 ml distilled water were then added separately from dropping funnels over a 15 minute period. The polymerisation was continued for a further 12 hours at 80° C. under an atmosphere of nitrogen.

Analysis showed that 92% of the starting monomers had been converted to polymeric form.

Each of the graft polymer aqueous solutions were subjected to ultrafiltration to remove the unreacted monomers.

The following Example will serve to illustrate the invention:

EXAMPLE

Graft terpolymers 1 to 7 as prepared in the preparations as just set forth were used in this Example.

The receiving elements were prepared by making an aqueous solution of each graft terpolymer such that the gelatin concentration of each solution was about 3% by weight. The non-ionic wetting agent saponin was added in the quantity of 100 ml of 1% aqueous solution per liter, and 1 g of the hardener 2,4-dichloro-6-hydroxy triazine sodium salt per liter of aqueous solution.

Each solution which had a viscosity of about 14 centipoises was then coated on to clear cellulose triacetate and then dried and incubated at 40° C. for 5 days to effect crosslinking of the graft terpolymer. The coating weight as gelatin on each sample was 130 mg/dm$^2$.

Each of the seven coatings were then dipped in 0.25% by weight of compound (5) aqueous solution for 20 seconds and dried. The visible spectrum was then measured. Each layer was then soaked in 0.1 N sulphuric acid for 5 minutes. It was treated with absorbent paper ("blotting paper") to remove excess acid and dried. The visible spectrum was re-measured.

$$\text{Substantivity} = \frac{\text{Absorbance at } \lambda_{max} \text{ soaked section}}{\text{Absorbance at } \lambda_{max} \text{ mordant layer}} \times 100$$

Results

| Graft polymer | Substantivity (%) |
|---|---|
| 1 | 98 |
| 2 | 85 |
| 3 | 66 |
| 4 | 90 |
| 5 | 65 |
| 6 | 63 |
| 7 | 92 |

A coating containing the same weight of gelatin but no mordant was also subjected to the same test procedure. The substantivity of compound (5) was 30%.

I claim:

1. A receiving element for transferred dyes which comprises a support having coated thereon a mordant layer which comprises a graft polymer which is prepared from at least three components:
   (a) a water-soluble proteinacious polymer
   (b) an acrylic monomer of the general formula $$\underset{CH_2=C-C-O-R_2}{\overset{R_1\ \ O}{|\ \ ||}} \quad (1)$$

or a vinyl monomer of the general formula $$\underset{CH_2=C-R_3}{\overset{R_1}{|}} \quad (2)$$

wherein $R_1$ is hydrogen, halogen or methyl and $R_2$ is alkyl or aryl and $R_3$ is aryl, acyloxy or cyano, and
   (c) an acrylate or methacrylate monomer of the general formula $$\underset{CH_2=C-C-O-Q-SO_3^-M^+}{\overset{R_4\ \ O}{|\ \ ||}} \quad (3)$$

where $R_4$ is hydrogen or methyl, Q is a bivalent organic radical and $M^+$ is an alkali metal or ammonium cation or an acrylamide or methacrylamide monomer of the formula $$\underset{CH_2=C-C-NH-Q-SO_3^-M^+}{\overset{R_4\ \ O}{|\ \ ||}} \quad (4)$$

where $R_4$ is hydrogen or methyl, Q is a bivalent organic radical and $M^+$ is an alkali metal or ammonium cation.

2. A receiving element according to claim 1 wherein the ratio of component (a) compared with component (b) is from 1 to (0.5–1.5) by weight.

3. A receiving element according to claim 1 wherein the ratio of component (b) compared with component (c) is from 1 to (0.05–0.5) by weight.

4. A receiving element according to claim 1 wherein the water-soluble proteinacious polymer (a) is gelatin.

5. A receiving element according to claim 1 wherein $R_2$ is alkyl with 1 to 5 carbon atoms or phenyl, $R_3$ is phenyl, acyloxy with 1 to 4 carbon atoms or cyano and $R_1$ has the meaning assigned to it in claim 1.

6. A receiving element according to claim 1 wherein component (b) is styrene, acrylonitrile, vinyl acetate, methyl methacrylate or ethyl acrylate.

7. A receiving element according to claim 1 wherein Q is an alkylene group with 2 to 6 carbon atoms optionally interrupted by —O—, —S— or —NH—.

8. A receiving element according to claim 1 wherein the support is a film base or a paper base.

9. A receiving element according to claim 8, wherein the film base or paper base is coated by a 3% by weight aqueous proteinacious graft polymer solution prepared from at least three components:
(a) a water-soluble proteinacious polymer
(b) an acrylic monomer of the general formula

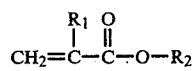 (1)

or a vinyl monomer of the general formula

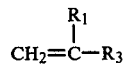 (2)

wherein $R_1$ is hydrogen, halogen or methyl and $R_2$ is alkyl or aryl and $R_3$ is aryl, acyloxy or cyano, and
(c) an acrylate or methacrylate monomer of the general formula

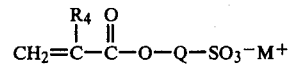 (3)

where $R_4$ is hydrogen or methyl, Q is a bivalent organic radical and $M^+$ is an alkali metal or ammonium cation or an acrylamide or methacrylamide monomer of the formula

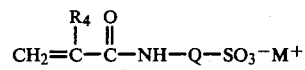 (4)

where $R_4$ is hydrogen or methyl, Q is a bivalent organic radical and $M^+$ is an alkali metal or ammonium cation.

10. A receiving element according to claim 9 which comprises adding to the aqueous solution of the proteinacious graft polymer a non-ionic wetting agent and a hardening agent.

11. A receiving element according to claim 10 wherein the amount of non-ionic wetting agent is 0.01 to 2% by weight of the coating solution, and amount of hardening agent is 0.1 to 5% by weight of gelatin present.

12. A receiving element according to claim 1 which comprises mordanted to the polymer a transferred dye.

13. A photographic assembly which comprises at least one light sensitive layer and integral with the assembly a receiving element according to claim 1.

* * * * *

UNITED STATES PATENT AND TRADEMARK OFFICE
CERTIFICATE OF CORRECTION

PATENT NO. : 4,278,749
DATED : July 14, 1981
INVENTOR(S) : Peter J. Wright

It is certified that error appears in the above—identified patent and that said Letters Patent is hereby corrected as shown below:

On the Title Page, Item [30], "Sep. 3," should read -- March 9, --.

Signed and Sealed this

Twenty-sixth Day of January 1982

[SEAL]

Attest:

GERALD J. MOSSINGHOFF

*Attesting Officer*  *Commissioner of Patents and Trademarks*